United States Patent
Wong et al.

(10) Patent No.: US 12,345,829 B2
(45) Date of Patent: Jul. 1, 2025

(54) METHOD FOR TESTING A TELECOMMUNICATION STANDARD-BASED POSITIONING, NAVIGATION, AND TIMING SYSTEM AND TEST DEVICE

(71) Applicant: Rohde & Schwarz GmbH & Co. KG, Munich (DE)

(72) Inventors: Kok Meng Wong, Munich (DE); Peter John Green, Munich (DE); Rajashekar Durai, Munich (DE); Stefan Maier, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 398 days.

(21) Appl. No.: 17/965,154

(22) Filed: Oct. 13, 2022

(65) Prior Publication Data

US 2024/0125884 A1  Apr. 18, 2024

(51) Int. Cl.
*G01S 5/02* (2010.01)

(52) U.S. Cl.
CPC ............ *G01S 5/0244* (2020.05); *G01S 5/021* (2013.01); *G01S 5/0226* (2013.01); *G01S 5/0264* (2020.05)

(58) Field of Classification Search
CPC ..... G01S 5/0244; G01S 5/0254; G01S 5/0226
USPC .......................................................... 342/451
See application file for complete search history.

(56) References Cited

U.S. PATENT DOCUMENTS

| | | | |
|---|---|---|---|
| 10,803,210 B2 | 10/2020 | Bergin et al. | |
| 12,185,262 B2* | 12/2024 | Tang | H04L 27/2607 |
| 2022/0053422 A1* | 2/2022 | Choi | H04W 48/10 |
| 2023/0273287 A1* | 8/2023 | Wigren | G01S 5/0294 |
| | | | 342/451 |

FOREIGN PATENT DOCUMENTS

WO   WO-2022133416 A1 *  6/2022 .......... G01S 5/0218

* cited by examiner

*Primary Examiner* — Harry K Liu
(74) *Attorney, Agent, or Firm* — CHRISTENSEN O'CONNOR JOHNSON KINDNESS PLLC (57) ABSTRACT

The present disclosure generally relates to a method for testing a telecommunication standard-based positioning, navigation, and timing system and a test device. The system includes the test device. Radio signals from at least three different transmitters are received by the test device. Each transmitter transmits a radio signal according to the telecommunication standard. An assessed position of the test device is determined based on the radio signals received by the test device. The position of the mobile device is determined by the test device additionally to the assessed position. The assessed position is compared with the determined position.

20 Claims, 3 Drawing Sheets

METHOD FOR TESTING A TELECOMMUNICATION STANDARD-BASED POSITIONING, NAVIGATION, AND TIMING SYSTEM AND TEST DEVICE

FIELD OF THE DISCLOSURE

Embodiments of the present disclosure generally relate to a method for testing a telecommunication standard-based positioning, navigation, and timing system. Furthermore, embodiments of the present disclosure also relate to a test device.

BACKGROUND

For mobile devices, such as smart phones, location information is usually provided by signals according to a global navigation satellite system (GNSS). However, these signals are vulnerable. For example, in certain places a GNSS signal may not be receivable by respective devices, such as inside houses or inside urban canyons.

Therefore, a backup system is required which may also be used to receive or at least to determine location information based thereon.

Signals according to certain telecommunication standards are used to transmit high data loads, such as for radio or video contents to TV screens and mobile devices. In particular, a technology so called "further evolved Multimedia Broadcast Multicast Service" (feMBMS) may be used which is part of the 3GPP Release 16 standard. Along with the radio or video contents, location and timing information can also be transmitted with such telecommunication standard signals, such as 5G Broadcast. However, the accuracy of the so determined location and timing information is unknown after deployment or maintenance phases.

Accordingly, there is need for a cost-effective and simple way to evaluate the reliability of the location and timing information derived from a telecommunication standards signal.

SUMMARY

A summary of certain embodiments disclosed herein is set forth below. It should be understood that these aspects are presented merely to provide a brief summary of these certain embodiments and that these aspects are not intended to limit the scope of this disclosure. This disclosure may encompass a variety of aspects that may not be set forth below.

The present disclosure provides examples of a method for testing a telecommunication standard-based positioning, navigation, and timing system (PNT system). The system comprises a test device. In an embodiment, the method comprises at least the following steps.

Radio signals from at least three different transmitters are received by the test device. Each transmitter transmits a radio signal according to the telecommunication standard.

An assessed position of the test device is determined by the test device based on the radio signals received. In other words, the assessed position is solely determined based on the radio signals received from the at least three different transmitters. The position of the test device itself is determined additionally to the assessed position. In other words, the assessed position is determined based on the radio signals received, whereas the position is determined in addition to that. Preferably, the position of the test device itself is determined based on information not derived from the radio signals received, e.g. differently.

The assessed position is compared with the position determined.

The so configured method provides, for example, a measure to compare the position derived from the radio signal with a position determined according to a different approach. Therefore, the precision and reliability of the position assessed based on the radio signals received may be evaluated and characterized.

To determine a position based on the radio signals received, a triangulation procedure may be applied. Hence, radio signals of the three different transmitters are then required. Consequently, based on a position determined according to a different approach, the method provides the possibility to determine whether the radio signals received from the respective transmitters are appropriately correlated to each other, whether their content is such that the position may be appropriately and whether their signal strength at the location of the test device is sufficient. Thus, the quality of the telecommunication standard-based radio signals may be judged according to the needs, such as after deployment or maintenance work.

In some embodiments, each transmitter is part of a base station used to distribute the radio signal according to the telecommunication standard. The plurality of base stations build up a network of base stations to provide the radio signal according to a predefined broadcast service area.

In some embodiments, the test device comprises circuitry such that received radio signals may be processed and a position may be assessed therefrom. In addition, the circuitry may also be applied to determine a position of the test device according to an approach which is not based on the radio signals. Optionally, the test device may comprise at least one data processing circuit in this regard.

In some embodiments, the test device comprises at least one reception device, for instance a receiving antenna, which may be configured such that the radio signals may be received. For example, the reception device may be coupled to the data processing circuit and provide the received radio signals thereto.

In some embodiments, the radio signal comprises a high frequency (HF) signal, such as within the MHz or GHz regime.

Optionally, the test device may be positioned at different locations. Accordingly, the method may be carried out at different locations so as to evaluate the quality of the radio signals received. In this regard, the test device may be "mobile", i.e. a mobile test device.

For example, the test device is "mobile" in a sense that it has dimensions and a weight such that it is movable from a first location to another location. The test device does not require to have motive power, such as an engine itself. It may also be mounted to support devices or vehicles such that it may be moved by the aid of the respective support device or vehicle.

Alternatively or additionally, the test device additionally determines a number of transmitters that transmit the radio signals according to the telecommunication standard for which a line of sight is available between the test device and the respective transmitters. This is beneficial as a coverage of the radio signals transmitted by the transmitters may be derived. Spoken differently, the precision of the underlying triangulation procedure becomes higher if more radio signals at a specific place are received. Therefore, a map may be determined with the corresponding number of transmitters for which a line of sight is provided. Accordingly, regions may be identified lacking a sufficient number or having an unnecessary large number of line of sight available transmitters.

In some embodiments, the test device additionally determines a channel impulse response (CIR) for each transmitter for which a line of sight is available depending on the assessed position. Based on the CIR a multipath effect may be determined. In other words, it may be determined whether a signal was reflected by objects, and if, how often it was reflected before being received by the test device.

In some embodiments, the test device receives a global navigation satellite system (GNSS) signal that is processed by the test device, thereby determining its position. Based on the GNSS signal, the position of the test device may be determined independent from the position assessed from the radio signals. Accordingly, a reference position may be determined such that the precision of the position assessed based on the radio signals received may be evaluated.

In some embodiments, in case of no GNSS signal received during a respective cycle, the assessed position is compared to a position determined by at least one GNSS signal latest received and measurement values acquired by an accelerometer of the test device. In certain situations, the GNSS signals may be not available as they may be blocked, for example in buildings, urban canyons or the like. Accordingly, complementary sensors, such as an accelerometer, may be used to acquire supplement information based on which the trajectory of the test device may be tracked and determined subsequent to a latest GNSS signal received. Therefore, even if no GNSS signal is available, a reliable determination of the position of the test device itself may be achieved.

Optionally, the test device additionally determines a timing synchronization between the transmitters based on the radio signals received. In other words, the received radio signals may be evaluated as to whether they timely correlate with each other.

In some embodiments, the timing synchronization between the transmitters is determined based on a comparison of actual time portions required by the respective radio signals received to reach the test device from the respective transmitters and expected time portions determined based on the assessed position of the test device and a position of the respective transmitter enclosed within the radio signal transmitted by that transmitter. This means, each radio signal transmitted by a transmitter requires a specific time portion before it is received by the test device. This actual time portion may be determined as the radio signal may comprise information as to when it was transmitted by the respective transmitter. The information as to when the radio signal was received may be determined by the test device. In addition, each radio signal transmitted by a respective transmitter may comprise information on a position of the respective transmitter. Considering the position of the test device which is assessed based on the respective radio signals received and the position of a respective transmitter (the information of which is included with the radio signal), thus, an expected time portion may be determined as to how long the transmission of the radio signal from that transmitter to the test device should last. Accordingly, the expected time portion may be compared to the actual time portion which may be used to evaluate the timing synchronization between the transmitters of which radio signals are received.

In some embodiments, a reference clock is used when determining the timing synchronization. The reference clock is provided by the GNSS signal received or by a high precision local clock device provided with the test device. Therefore, the time information included with the radio signals may be compared to each other at high precision.

In some embodiments, the assessed position is characterized with regard to a performance criterion based on the comparison performed in view of a configuration of transmitters from which the radio signals are received. In other words, the assessed position is compared to the position determined based on information different than the radio signals. This assessed position may be characterized in view of a performance criterion which of course depends on the configuration of transmitters of which radio signals are received. Thus, although the precision of the assessed position may be improved if a higher number of radio signals is received, this configuration may be correspondingly compared by the performance criterion to a configuration of a different number of radio signals received. In other words, the performance criterion may for example compensate for different numbers of transmitters from which radio signals are received.

In some embodiments, a velocity of the test device is additionally determined based on subsequent assessed positions and compared to a velocity determined based on subsequent positions determined subsequently, or based on measurement values acquired by an accelerometer of the test device. The velocity may be considered to further improve the evaluation of the radio signal based determination of the position. For example, the radio signal received may be compensated for the Doppler effect which depends on the velocity of the test device relative to the respective transmitter.

Optionally, the test device is mobile and moved according to a predetermined or a random route by a ground or aerial vehicle to which the mobile test device is mounted. The vehicle may be used to move the mobile test device. Accordingly, the radio signals configurations may be evaluated across certain areas or regions.

In some embodiments, the telecommunication standard is a 5G telecommunication standard. 5G telecommunication standard signals provide sufficient data transfer rates to include radio or video contents as well as timing information.

In some embodiments, the method as previously described can be executed in particular in a computer-implemented manner According to a further aspect, there is also provided a computer program product comprising instructions which, when executed by a data processing device, cause the data processing device to execute the method as previously described.

Further, according to a further aspect, there is also provided a data storage medium comprising the computer program product as previously described such that, when executed by a data processing device, it causes the data processing device to execute the method as previously described.

According to another aspect, a test device is provided. The test device comprises, for example, at least one receiving antenna and a data processing circuit coupled to the at least one receiving antenna. The test device is configured to receive by the at least one receiving antenna radio signals from at least three different transmitters. Each transmitter transmits a radio signal according to a telecommunication standard. The test device is configured to determine its position based on information independent from the radio signals. The test device is also configured to determine at least an assessed position of the test device based on the received radio signals by the at least one data processing circuit. Moreover, the test device is configured to compare the assessed position determined based on the received radio signals to the position determined by the at least one data processing circuit.

The so configured test device is such that the same advantages may be achieved which have been explained in view of the method introduced hereinbefore.

Optionally, the test device is also configured to receive at least one global navigation satellite system (GNSS) signal by the at least one receiving antenna. Therefore, the receiving antenna is capable of receiving both radio signals and GNSS signals. Accordingly, the complexity of the test device is reduced compared to a configuration of two separate receiving antennas required in this regard.

In some embodiments, the test device is additionally configured to determine a number of transmitters that transmit radio signals according to the telecommunication standard for which a line of sight is available between the test device and the respective transmitters by the at least one data processing circuit. Therefore, the coverage of the available radio signals may be evaluated.

In some embodiments, the test device is additionally configured to determine a CIR for each transmitter for which a line of sight is available depending on the assessed position determined based on the received radio signals by the at least one data processing circuit. Based on the CIR a multipath effect may be determined.

Optionally, the test device is also configured to receive a GNSS signal that is processed by the data processing circuit, thereby determining its position.

Alternatively or additionally, the position of the test device itself may either be determined based on a GNSS signal received or a sensor device configured to provide information based on which the position is determinable, such as an accelerometer or the like. Also, the position may be determined based on a combination of information underlying a GNSS signal and information measured by a sensor device.

Accordingly, in some embodiments, the test device comprises at least one accelerometer coupled to the at least one data processing circuit. In case of no GNSS signal being received during a respective cycle, the test device is configured to compare the assessed position determined based on the received radio signals to a position determined by at least one GNSS signal latest received, and measurement values acquired by an accelerometer of the test device by the data processing circuit. Consequently, even if no GNSS signal is received at certain locations, the position of the mobile test device may still be determinable independent from the radio signals received.

Optionally, the test device is additionally configured to determine a timing synchronization between the transmitters based on the received radio signals. The at least one data processing circuit may be applied in this regard. The underlying evaluation mechanism is explained hereinbefore.

In some embodiments, the timing synchronization between the transmitters is determined based on a comparison of actual time portions required by the respective received high frequency signals to reach the test device from the respective transmitter and expected time portions determined based on the determined position of the test device and a position of the respective transmitter enclosed within the high frequency signal transmitted by that transmitter. Hence, a reliable determination procedure is provided such that the timing synchronization may be evaluated.

Optionally, a reference clock is used during determining the time synchronization. The reference clock is provided by the received GNSS signal or by a high precision local clock device provided with the test device. Thus, a reference point in time is provided such that the reliability of the determination mechanism underlying the evaluation of the timing synchronization is further improved.

In some embodiments, the test device additionally comprises a storage device coupled to the at least one data processing circuit. At least one of the assessed position and the position determined elsewise is stored within the storage device. Consequently, a data base of the assessed and/or determined positions may be built up for further processing thereof. For example, a three-dimensional map containing information of a location-dependent performance criterion may be generated.

In some embodiments, the test device comprises a ground or aerial vehicle to which the test device is mounted, i.e. it is a mobile test device. The mobile test device is moved according to a predetermined or a random route by the ground or aerial vehicle. Thus, the radio signal based assessed position may be evaluated according to a random or predetermined mapping.

All features and embodiments disclosed with respect to any aspect of the present disclosure are combinable alone or in (sub-)combination with any one of the remaining aspects of the present disclosure.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
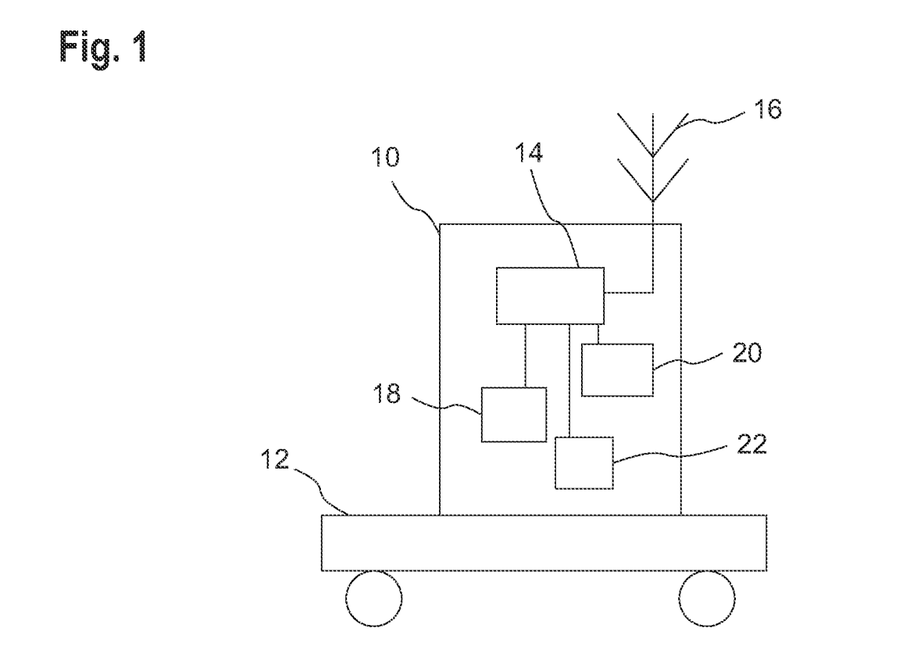
FIG. 1 is a schematic drawing of an example test device mounted to a ground vehicle.

FIG. 1 is a schematic drawing of an example of a test device 10 mounted to a ground vehicle 12. In the embodiment shown, the test device 10 comprises a data processing circuit 14 and a receiving antenna 16. The receiving antenna 16 is configured such that radio signals, in particular having frequencies within the MHz or GHz regime may be received therewith.

Also, GNSS signals may be received by the receiving antenna 16. In this regard, the receiving antenna 16 is multifunctional. In principle, the test device 10 may also comprise separate receiving antennas 16 for receiving signals of different types, such as radio signals and GNSS signals. The receiving antenna 16 is coupled to the data processing circuit 14 and provides received signals thereto.

The test device 10 also comprises an accelerometer 18, an electronic storage device 20, and a reference clock 22, all coupled to the data processing circuit 14. Thus, the data processing circuit 14 is capable of processing the different information obtained from the different components coupled thereto.

By the electronic storage device 20, processed data, such as assessed or determined positions may be stored therewith. Accordingly, a data base may be built up.

The reference clock 22 is a high precision clock which may be used to evaluate timely correlations between different quantities, such as between signals received from different transmitters.

The accelerometer 18 is configured to measure acceleration and rotation values of the test device 10 such that a route followed may be determined. In other words, any movement of the test device 10 may be measured and/or recorded by the accelerometer 18. This also provides the possibility to determine a position of the test device 10 if a reference point is provided. The reference point may for example be derived from a GNSS signal received.

The accelerometer 18, the electronic storage device 20, and the reference clock 22 are optional features of the test device 10.

The ground vehicle 12 is configured for mounting of the test device 10 such that the test device 10 may be moved according to a random or predetermined route.

Figure 2:
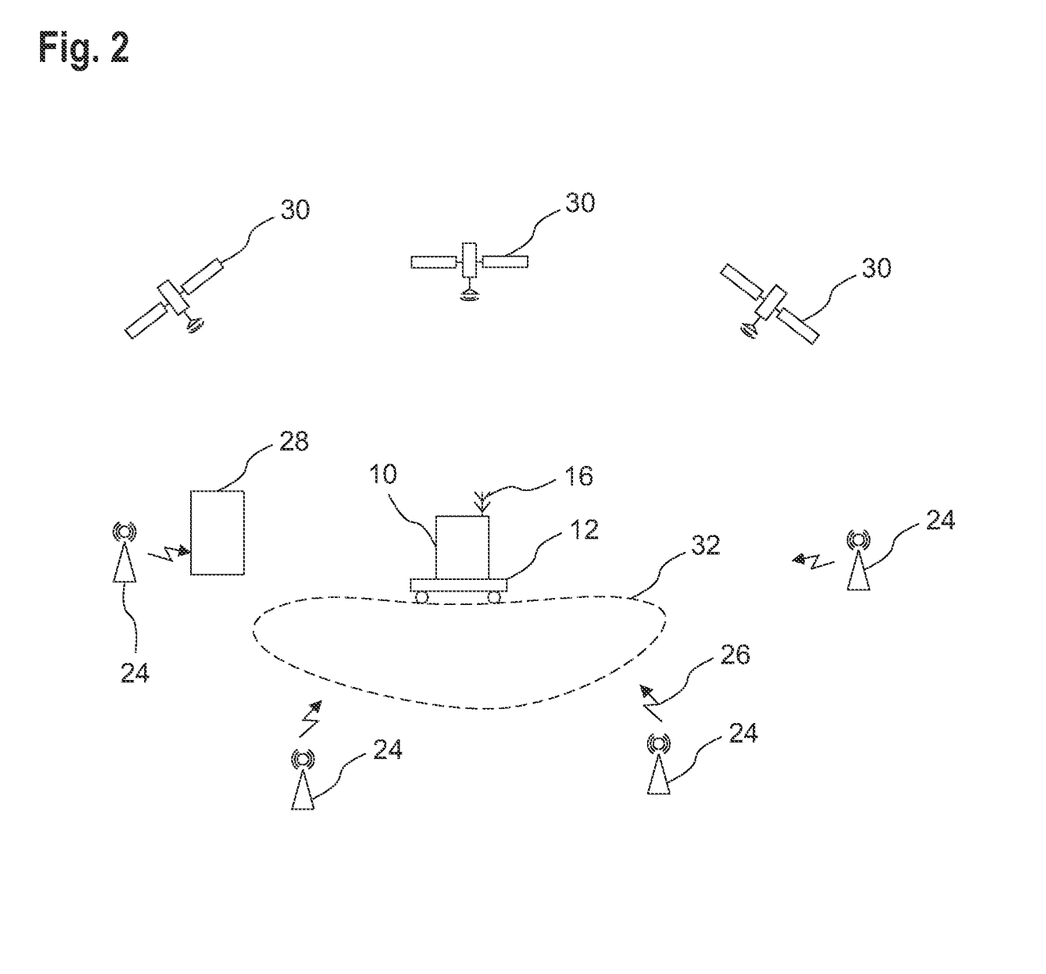
FIG. 2 is a schematic drawing of a test device, several transmitters, and GNSS satellites.

FIG. 2 is a schematic drawing of an example arrangement of the test device 10, several transmitters 24, and GNSS satellites 30. Here, a general scenario is shown which may be used to evaluate the precision and reliability of an assessed position determined based on radio signals received.

Each transmitter 24 is part of a base station and configured to transmit a radio signal 26 according to a telecommunication standard, such as 5G or 5G-NR. The transmitters 24 establish a network of radio signal 26 transmitting devices to broadcast the radio signals 26 within a specific area such that certain services may be provided within that area. For example, radio or video contents may be provided.

Before the radio signals 26 reach the test device 10, some of the radio signals 26 may be reflected by other objects, such as a building 28. Such reflection processes may be generally identified based on a determination of the CIR.

The GNSS satellites 30 are configured to provide GNSS signals based on which a position may be determined. However, at certain locations, such as urban canyons or inside buildings, GNSS signals may not be receivable since their signal amplitude is too low.

A reference time signal may also be provided with the GNSS signals, for example, as an alternative to the reference clock 22.

The test device 10 is mounted to the ground vehicle 12 and, according to this embodiment, moved along the predetermined route 32. Thus, the radio signals 26 may be received and correspondingly evaluated at different locations along the route 32.

Figure 3:
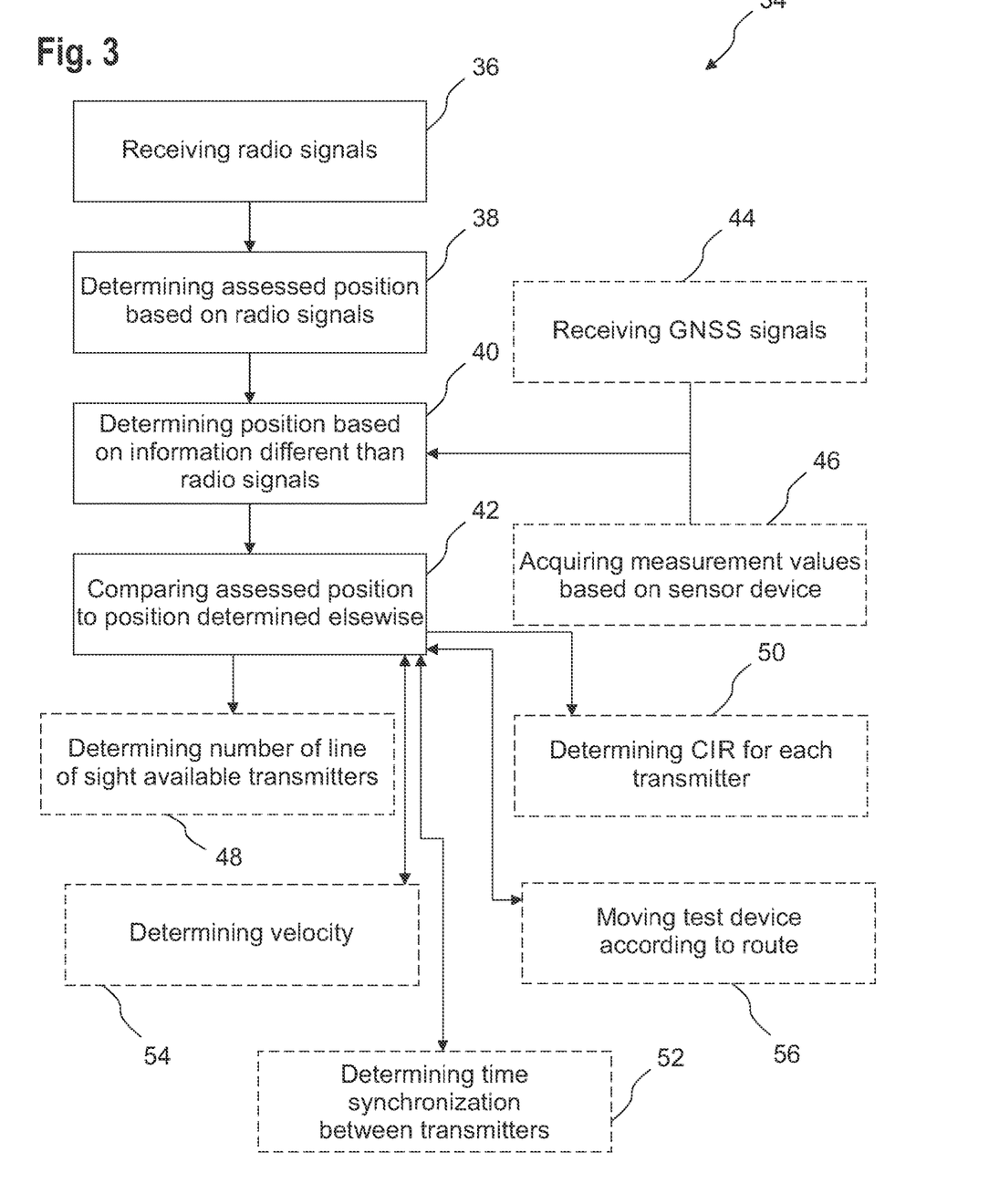
FIG. 3 is a schematic drawing of an example method for testing a telecommunication standard-based PNT system.

FIG. 3 is a schematic drawing of an example method 34 for testing a telecommunication standard-based PNT system. The radio signals 26 are usually used to provide and broadcast radio or video contents or the like therewith. However, according to the method 34 the radio signals 26 may be used as an alternative to other information based on which a position, a navigation, or a timing may be determined, such as a GNSS signal. This is beneficial if e.g. the GNSS signals are not receivable.

Optional steps of the method 34 are shown using dashed lines.

In step 36, radio signals 26 from at least three different transmitters are received by the test device 10. In this regard, the receiving antenna 16 is applied. The minimum number of three is required as a triangulation procedure is applied hereinafter.

In step 38, an assessed position of the test device 10 is determined based on the radio signals 26 received by the test device 10. This is achieved using the data processing circuit 14 of the test device 10.

In step 40, the position of the test device 10 itself is determined additionally to the assessed position. Here, information is used different from the radio signals 26. Again, the data processing circuit 14 of the test device 10 is applied in this regard.

Accordingly, the position of the test device 10 is determined twice based on different concepts, namely based on the radio signals 26 received and in a different way, e.g. by the GNSS signal received.

Then, in step 42, the assessed position is compared with the position determined to evaluate the precision and reliability of the assessed position which is based not on a GNSS signal but on a radio signal 26 transmitted by the transmitters 24. Here, the data processing circuit 14 of the test device 10 is applied as well.

Optionally, the information based on which the position of the test device 10 is determined in step 40 may be provided according to step 44 and/or step 46. In step 44 a GNSS signal is received by the receiving antenna 16 of the test device 10. The GNSS signal is transmitted by GNSS satellites 30.

Alternatively or additionally, information may also be considered which is based on measurement values acquired by the accelerometer 18 of the test device 10 in step 46. The accelerometer 18 may for example be used if no GNSS signal is receivable or their signal quality is too bad. Then, a latest GNSS signal received may be utilized, and from that location on, information based on measurement values acquired by the accelerometer 18 may be considered.

In optional step 48, a number of transmitters 24 that transmit the radio signals 26 according to the telecommunication standard for which a line of sight is available between the test device 10 and the respective transmitters 24 may be determined. Based on this information a coverage map of the radio signals 26 may be generated.

In optional step 50, the CIR is determined for each transmitter 24 for which a line of sight is available depending on the assessed position. Accordingly, reflection actions of the radio signals 26 due to objects, such as buildings 28 or the like, may be determined. In optional step 52, a timing synchronization between the transmitters 24 may be determined based on the radio signals 26 received from the respective transmitters 24. For example, each radio signal may comprise time information as to when it was transmitted by the respective transmitter 24. The reference clock 22 may be applied to evaluate whether the time stamps provided by the transmitters 24 correlate to each other or whether there is a difference above a predetermined threshold. This way, for example time deviations between the transmitters 24 may be identified which may be compensated for. Accordingly, information derived from the evaluation of the timing synchronization may be considered in step 42.

In some embodiments, in step 52, the timing synchronization may also be evaluated based on the actual time portions which pass during the transmission of the radio signals 26 from the respective transmitter 24 towards the test device 10 compared to expected time portions determined based on the assessed position of the test device 10 and a position of the respective transmitter 24 enclosed within the radio signal 26 transmitted by that transmitter 24.

In optional step 54, the velocity of the test device 10 is determined based on subsequent assessed positions and compared to a velocity determined based on subsequent positions determined subsequently, or measurement values acquired by an accelerometer 18 of the test device 10. The determined velocity may also be considered in step 42, for example, so as to compensate for the Doppler effect.

The optional steps 48, 50, 52, and 54 are carried out utilizing the data processing circuit 14 of the test device 10.

In optional step 56, the test device 10 is moved according to a predetermined or a random route 32 by the ground vehicle 12 to which the test device 10 is mounted. Accordingly, the radio signal 26 based position may be determined at different locations so as to evaluate the reliability of this determination procedure.

Optionally, in step 42, the assessed position is characterized with regard to a performance criterion based on the comparison performed in view of a configuration of transmitters 24 from which the radio signals 26 are received. Hence, assessed positions which are determined based on different numbers of radio signals 26 received may be compared to each other based on the performance criterion.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, one or more non-transitory computer-readable media contains computer readable instructions stored thereon that, when executed by one or more computer circuits, sometimes referred to as computing devices, cause the one or more computer circuits to perform one or more steps of any of the methods described herein, such as one or more actions described in association with the blocks of FIG. 3, or claimed hereinafter. In other embodiments, one or more of these method steps can be implemented in digital and/or analog circuitry or the like.

It should now be appreciated that some embodiments of the present disclosure, or portions thereof, have been described in the general context of computer code or machine-useable instructions, including computer-executable instructions such as program modules, being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for testing a telecommunication standard-based positioning, navigation, and timing system, the system comprising a test device, the method comprising:
   receiving, by the test device, radio signals from at least three different transmitters, each transmitter transmitting a radio signal according to the telecommunication standard;
   determining, by the test device, an assessed position of the test device based on the radio signals received from the at least three different transmitters;
   determining, by the test device, its position in addition to the assessed position;
   comparing the assessed position with the position determined by the test device, and
   characterizing the assessed position with regard to a performance criterion based on the comparison performed in view of a configuration of the at least three transmitters from which the radio signals are received.

2. The method of claim 1, wherein the test device determines a number of transmitters that transmit the radio signals according to the telecommunication standard for which a line of sight is available between the test device and the respective transmitters.

3. The method of claim 2, wherein the test device determines a channel impulse response for each transmitter for which a line of sight is available depending on the assessed position.

4. The method of claim 1, wherein the test device receives a GNSS signal that is processed by the test device, thereby determining its position.

5. The method of claim 4, wherein, in case of no GNSS signal received during a respective cycle, the assessed position is compared to a position determined by
   at least one GNSS signal latest received, and
   measurement values acquired by an accelerometer of the test device.

6. The method of claim 1, wherein the test device additionally determines a timing synchronization between the transmitters based on the radio signals received.

7. The method of claim 6, wherein the timing synchronization between the transmitters is determined based on a comparison of actual time portions required by the respective radio signals received to reach the test device from the respective transmitters and expected time portions determined based on the assessed position of the test device and a position of the respective transmitter enclosed within the radio signal transmitted by that transmitter.

8. The method of claim 6, wherein a reference clock is used when determining the time synchronization, wherein the reference clock is provided by the GNSS signal received or by a high precision local clock device provided with the test device.

9. The method of claim 1, wherein additionally a velocity of the test device is determined based on subsequent assessed positions and compared to a velocity determined based on
subsequent positions determined subsequently, or
measurement values acquired by an accelerometer of the test device.

10. The method of claim 1, wherein the test device is moved according to a predetermined or a random route by a ground or aerial vehicle to which the test device is mounted.

11. The method of claim 1, wherein the telecommunication standard is a 5G telecommunication standard.

12. A test device comprising:
at least one receiving antenna; and
a data processing circuit coupled to the at least one receiving antenna,
wherein the test device is configured to receive, by the at least one receiving antenna, radio signals from at least three different transmitters, each transmitter transmitting a radio signal according to a telecommunication standard,
wherein the test device is configured to determine its position,
wherein the test device is configured to determine, by the at least one data processing circuit, at least an assessed position of the test device based on the received radio signals additionally to the position,
wherein the test device is configured to compare, by the at least one data processing circuit, the assessed position determined based on the received radio signals to the position determined, and
wherein the assessed position is characterized with regard to a performance criterion based on the comparison performed in view of a configuration of the at least three transmitters from which the radio signals are received.

13. The test device of claim 12, wherein the test device is configured to determine, by the at least one data processing circuit, a number of transmitters that transmit radio signals according to the telecommunication standard for which a line of sight is available between the test device and the respective transmitters.

14. The test device of claim 13, wherein the test device is configured to determine, by the at least one data processing circuit, a channel impulse response for each transmitter for which a line of sight is available depending on the assessed position determined based on the received radio signals.

15. The test device of claim 12, wherein the test device is configured to receive a GNSS signal that is processed by the data processing circuit, thereby determining its position.

16. The test device of claim 15, further comprising at least one accelerometer coupled to the at least one data processing circuit, wherein, in case of no GNSS signal being received during a respective cycle, the test device is configured to compare, by the data processing circuit, the assessed position determined based on the received radio signals to a position determined by
at least one GNSS signal latest received, and
measurement values acquired by an accelerometer of the test device.

17. The test device of claim 12, wherein the test device is configured to determine, by the at least one data processing circuit, a timing synchronization between the transmitters based on the received radio signals.

18. The test device of claim 12, further comprising a storage device coupled to the at least one data processing circuit, wherein at least one the assessed position and the position determined is stored within the storage device.

19. The test device of claim 12, further comprising a ground or aerial vehicle to which the test device is mounted, wherein the test device is moved according to a predetermined or a random route by the ground or aerial vehicle.

20. A test device, comprising:
at least one receiving antenna configured to receive by the at least one receiving antenna radio signals from at least three different transmitters, each transmitter transmitting a radio signal according to a telecommunication standard; and
a data processing circuit coupled to the at least one receiving antenna,
wherein the test device is configured to determine its position,
wherein the at least one data processing circuit is configured to:
determine at least an assessed position of the test device based on the received radio signals;
compare the assessed position to the position determined, and
determine a number of transmitters that transmit radio signals according to the telecommunication standard for which a line of sight is available between the test device and the respective transmitters.

* * * * *